US010677996B2

(12) United States Patent
Aoshima et al.

(10) Patent No.: US 10,677,996 B2
(45) Date of Patent: Jun. 9, 2020

(54) OPTICAL CONNECTOR, DETACHING JIG, AND CAP

(71) Applicants: SEI OPTIFRONTIER CO., LTD., Yokohama-shi, Kanagawa (JP); SUMITOMO ELECTRIC INDUSTRIES, LTD., Osaka-shi, Osaka (JP)

(72) Inventors: Yohei Aoshima, Yokohama (JP); Tomoyuki Yokokawa, Yokohama (JP); Tsuneari Ito, Osaka (JP); Kenichiro Otsuka, Osaka (JP)

(73) Assignees: SEI OPTIFRONTIER CO., LTD., Yokohama-shi, Kanagawa (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/294,102

(22) Filed: Mar. 6, 2019

(65) Prior Publication Data

US 2019/0278029 A1 Sep. 12, 2019

(30) Foreign Application Priority Data

Mar. 8, 2018 (JP) ................................ 2018-041755

(51) Int. Cl.
*G02B 6/38* (2006.01)

(52) U.S. Cl.
CPC ......... *G02B 6/3825* (2013.01); *G02B 6/3879* (2013.01); *G02B 6/3898* (2013.01); *G02B 6/3849* (2013.01); *G02B 6/3897* (2013.01)

(58) Field of Classification Search
CPC .. G02B 6/3825; G02B 6/3898; G02B 6/3879; G02B 6/3849; G02B 6/3897
See application file for complete search history.

(56) References Cited

U.S. PATENT DOCUMENTS

| | | | | |
|---|---|---|---|---|
| 6,318,903 | B1 | 11/2001 | Andrews et al. | |
| 6,343,950 | B1 | 2/2002 | Eginton et al. | |
| 6,796,844 | B1 | 9/2004 | Edwards, III | |
| 6,857,900 | B2 | 2/2005 | Kleeberger et al. | |
| 7,140,911 | B1 | 11/2006 | Rector et al. | |
| 8,920,043 | B2 | 12/2014 | Iwaya et al. | |
| 9,069,149 | B2 * | 6/2015 | Yu | G02B 6/3898 |
| 2014/0161397 | A1 | 6/2014 | Gallegos et al. | |

(Continued)

FOREIGN PATENT DOCUMENTS

| | | | |
|---|---|---|---|
| JP | S60-026009 | A | 2/1985 |
| JP | 2012-242781 | A | 12/2012 |

*Primary Examiner* — John Bedtelyon
(74) *Attorney, Agent, or Firm* — Faegre Drinker Biddle & Reath LLP

(57) ABSTRACT

An optical connector according to an exemplary embodiment is an optical connector including a plurality of optical connector plugs collectively connected to each of a plurality of adapters arranged along a first direction and a second direction intersecting the first direction, along a connection direction intersecting both the first direction and the second direction, the optical connector includes: a plurality of holders configured to be arranged along the second direction while holding the plurality of optical connector plugs arranged in the first direction, and a handle configured to hold the plurality of holders arranged in the second direction.

18 Claims, 8 Drawing Sheets

12
13g
11
5
5b
13r
5a
13c
13h
13b
13e
5a
D2
D3
D1
11
13
13d
1

(56) References Cited

U.S. PATENT DOCUMENTS

| | | | |
|---|---|---|---|
| 2014/0241671 | A1 | 8/2014 | Koreeda et al. |
| 2014/0270675 | A1 | 9/2014 | Yu |
| 2015/0346438 | A1 | 12/2015 | Kato |

* cited by examiner 12c
12f
12e
12g
12a
12
11c
11
3
12h
12j
12d
12k
11h
11c
11
D1
D2
D3

12
12a
11d
12m
12b
11c
11e
11f
11
11b
11a
D3
D1

13
13b
D3
D1
30
13n
13f(13a)
13p
13t
13g
13s
13s1
13s
13s1
13g1
13r
13r
13r
13m
13k(13q)
13h(13q)
13q1
13m
13j(13q)
13q1
13m
13q1

OPTICAL CONNECTOR, DETACHING JIG, AND CAP

TECHNICAL FIELD

The present disclosure relates to an optical connector having a plurality of optical connector plugs connected collectively, a detaching jig, and a cap.

BACKGROUND

Japanese Unexamined Patent Publication No. 2012-242781 discloses an optical connector for collectively inserting and extracting a plurality of optical connector plugs. The optical connector includes three plug units, a housing integrally covering the periphery of the three plug units, and a support flat plate for supporting the three plug units inside the housing. Each of the three plug units includes a lock mechanism for performing an engagement with an adapter.

SUMMARY

According to an aspect of the present disclosure, an optical connector includes: a plurality of optical connector plugs collectively connected to each of a plurality of adapters arranged along a first direction and a second direction intersecting the first direction, along a connection direction intersecting both the first direction and the second direction, wherein the optical connector includes: a plurality of holders configured to be arranged along the second direction while holding the plurality of optical connector plugs arranged in the first direction, and a handle configured to hold the plurality of holders arranged in the second direction.

DETAILED DESCRIPTION

Figure 1:
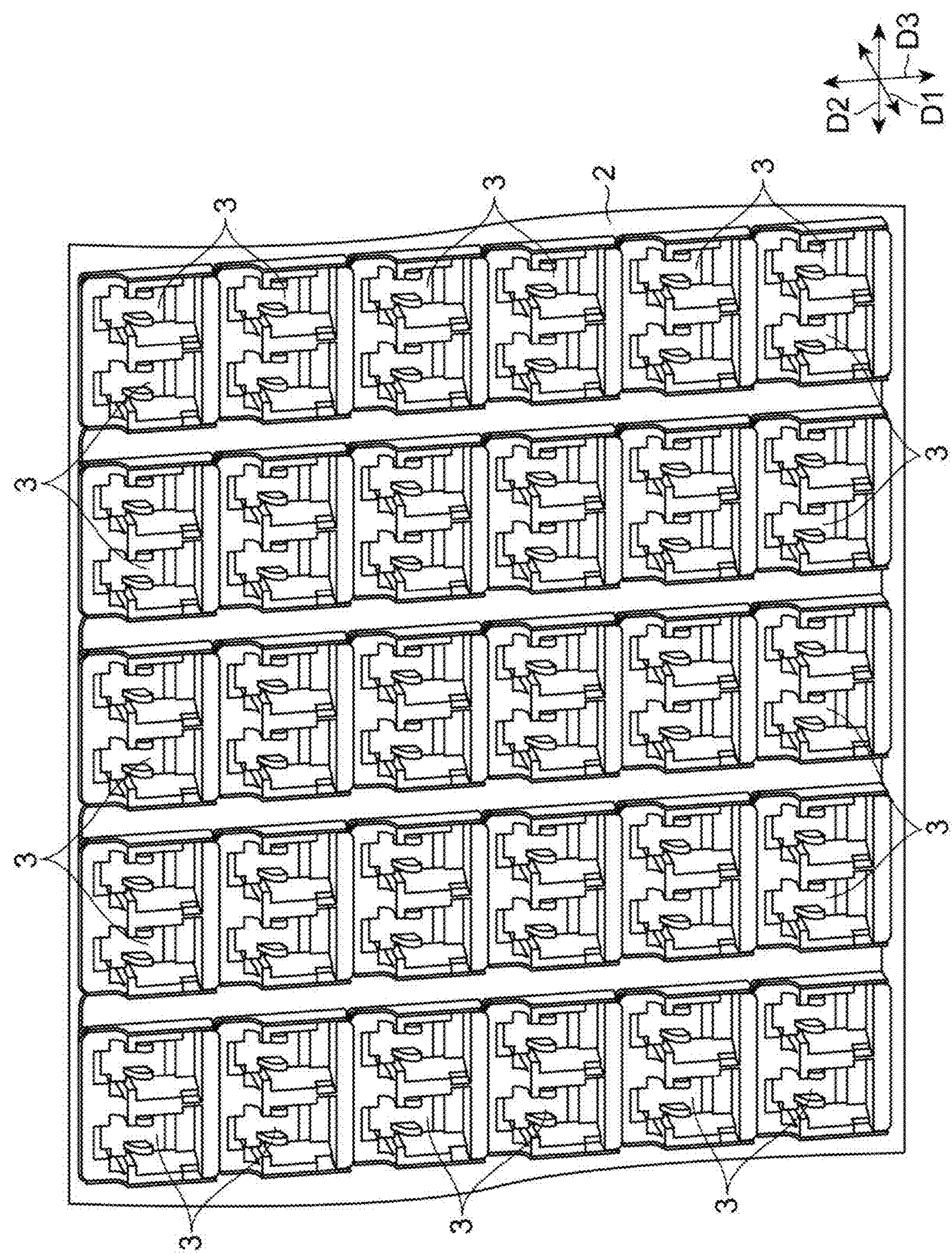
FIG. 1 is a perspective view illustrating an example of an adapter to which an optical connector according to an exemplary embodiment of the present disclosure is connected.

In the optical connector, there are cases in which there is a plurality of portions where the optical connector plugs and the adapter are engaged, and a latch mechanism (lock mechanism) is provided for each of all the optical connector plugs. In the optical connector, when many latch mechanisms are provided, a large pushing force is required to push the optical connector plugs into the adapter, and it is assumed that the optical connector plug cannot be smoothly inserted into the adapter due to large insertion resistance. In addition, when the insertion resistance of the optical connector plugs is high, there is concern that a portion of the plurality of optical connector plugs is not sufficiently inserted.

An object of the present disclosure is to provide an optical connector, a detaching jig, and a cap capable of sufficiently inserting a plurality of optical connector plugs while smoothly inserting the plurality of optical connector plugs by reducing a pushing force of the optical connector plugs.

According to the present disclosure, by reducing the pushing force of the optical connector plugs, the optical connector plugs can be smoothly inserted, and the plurality of optical connector plugs can be sufficiently inserted.

First, the contents of exemplary embodiments of the present disclosure will be listed and described. An optical connector according to an exemplary embodiment is an optical connector including a plurality of optical connector plugs collectively connected to each of a plurality of adapters arranged along a first direction and a second direction intersecting the first direction, along a connection direction intersecting both the first direction and the second direction, and the optical connector includes: a plurality of holders configured to be arranged along the second direction while holding the plurality of optical connector plugs arranged in the first direction, and a handle configured to hold the plurality of holders arranged in the second direction.

The optical connector according to an exemplary embodiment includes a plurality of optical connector plugs collectively connected to a plurality of adapters along a connection direction, and the plurality of optical connector plugs are arranged along the first direction and are arranged along a second direction. The optical connector includes a plurality of holders arranged along the second direction, and the plurality of optical connector plugs arranged in the first direction are gathered and held by each holder. In addition, in the optical connector, the plurality of holders arranged in the second direction are gathered and held by the handle. Therefore, the plurality of optical connector plugs are gathered and held in the first direction by the holders and are gathered and held in the second direction by the handle. Therefore, when the plurality of optical connector plugs are pushed into the adapters in the connection direction and inserted into the adapters, it is possible to suppress an escape of the pushing force in the first direction and the second direction intersecting the connection direction. Therefore, since the pushing force can be more reliably transmitted in the connection direction, the pushing force of the optical connector can be reduced. As a result, the plurality of optical connector plugs can be collectively and smoothly inserted and the plurality of optical connector plugs can be sufficiently inserted.

The handle may have a wall portion facing at least one of a first direction side and a second direction side of the holder. In this case, even though a force is applied to the holder in the first direction or the second direction at the time of inserting the plurality of optical connector plugs, rattling of the holder can be suppressed by a contact of the holder with the wall portion. Therefore, by suppressing the rattling of the holder holding the plurality of optical connector plugs, the insertion of the plurality of optical connector plugs can be more smoothly performed.

The handle may have ribs that are in contact with the holder from an opposite side of the adapter. In this case, even though the holder tries to dislocate to the opposite sides of the adapters when pushing the plurality of optical connector plugs into the adapters, the dislocation of the holder can be suppressed by a contact of the ribs with the holder. Therefore, since the dislocation of the holder at the time of inserting the plurality of optical connector plugs can be suppressed by the ribs, the insertion of the plurality of optical connector plugs held by the holder into the adapters can be more smoothly and sufficiently performed.

The optical connector plug has a latch engaging the adapter, and the holder may push down the latch when pulled to the opposite side of the adapter to release the engagement between the optical connector plug and the adapter. In this case, the holder includes a push-pull mechanism that pushes down the latch of the optical connector plug when pulled to the opposite side of the adapter to release the engagement of the latch. Therefore, by pulling the holder to the opposite side of the adapter, the engagement between the optical connector plug and the adapter can be easily released. Therefore, extraction of the optical connector from the adapter can be easily performed.

The detaching jig according to an exemplary embodiment of the present disclosure is a jig used in the optical connector described above, and detaches the handle from the plurality of holders in a state in which the detaching jig is engaged with the handle. Since the handle can be detached from the plurality of holders by the detaching jig, the plurality of optical connector plugs arranged in the first direction can be separated from the plurality of optical connector plugs arranged in both the first direction and the second direction. Therefore, the plurality of separated optical connector plugs arranged in the first direction can be inserted into a desired adapter.

The cap according to an exemplary embodiment of the present disclosure is a cap used in the optical connector described above, and is engaged with the plurality of optical connector plugs to seal the plurality of optical connector plugs. By the cap, the plurality of optical connector plugs detached from the adapter can be reliably sealed and the plurality of optical plugs can be protected.

Specific examples of the optical connector, the detaching jig, and the cap according to the exemplary embodiment of the present disclosure will be described with reference to the drawings. The present invention is not limited to the following illustrative examples, but is intended to be indicated by the scope of the claims and include all modifications within the scope equivalent to the claims. In the description of the drawings, the same or corresponding elements are denoted by the same reference numerals, and redundant explanation will be appropriately omitted. In addition, the drawings are sometimes drawn in a simplified or exaggerated manner in part in order to facilitate understanding, and the dimensional ratios and the like are not limited to those described in the drawings.

Figure 2:
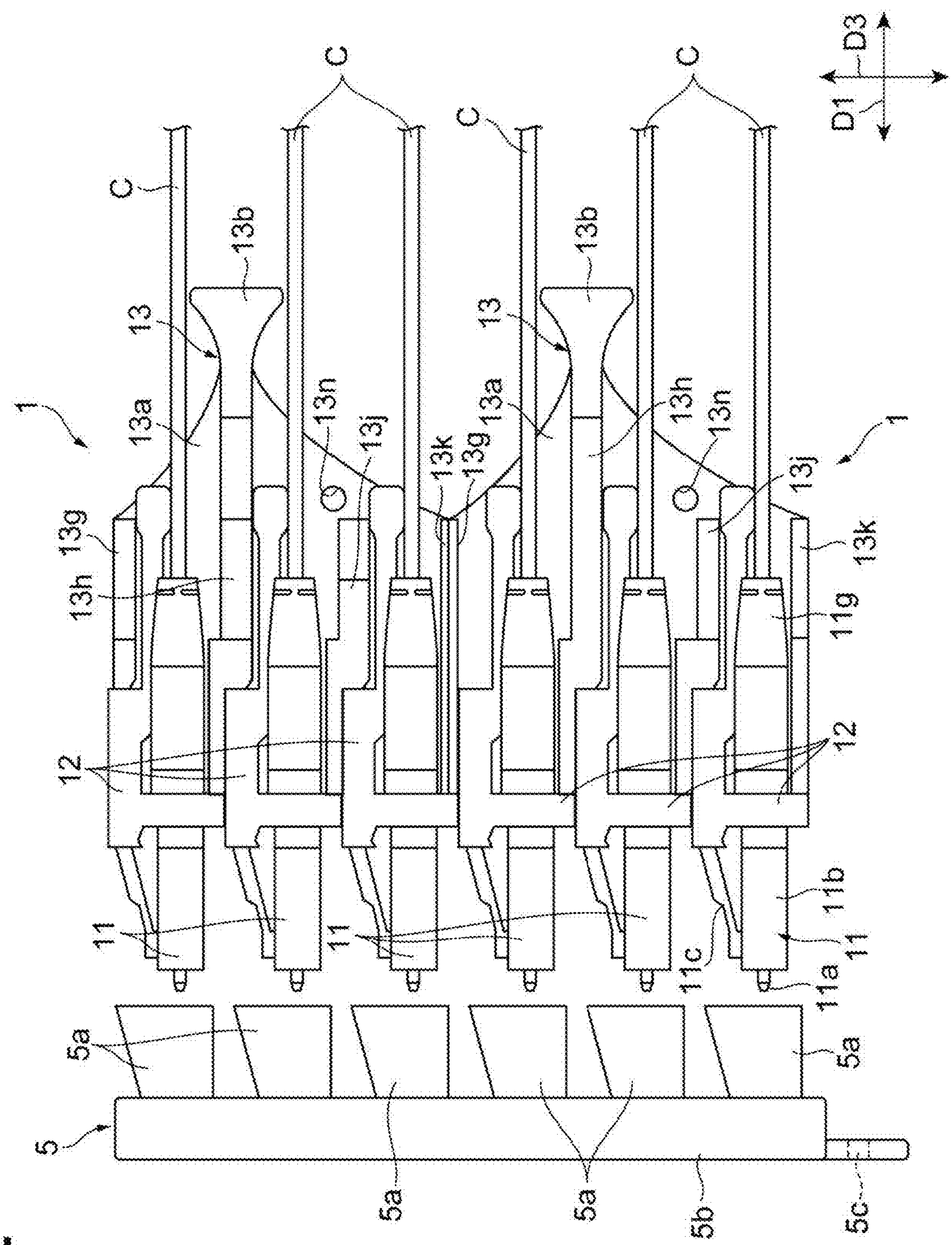
FIG. 2 is a side view illustrating an optical connector according to an exemplary embodiment.
Figure 3:
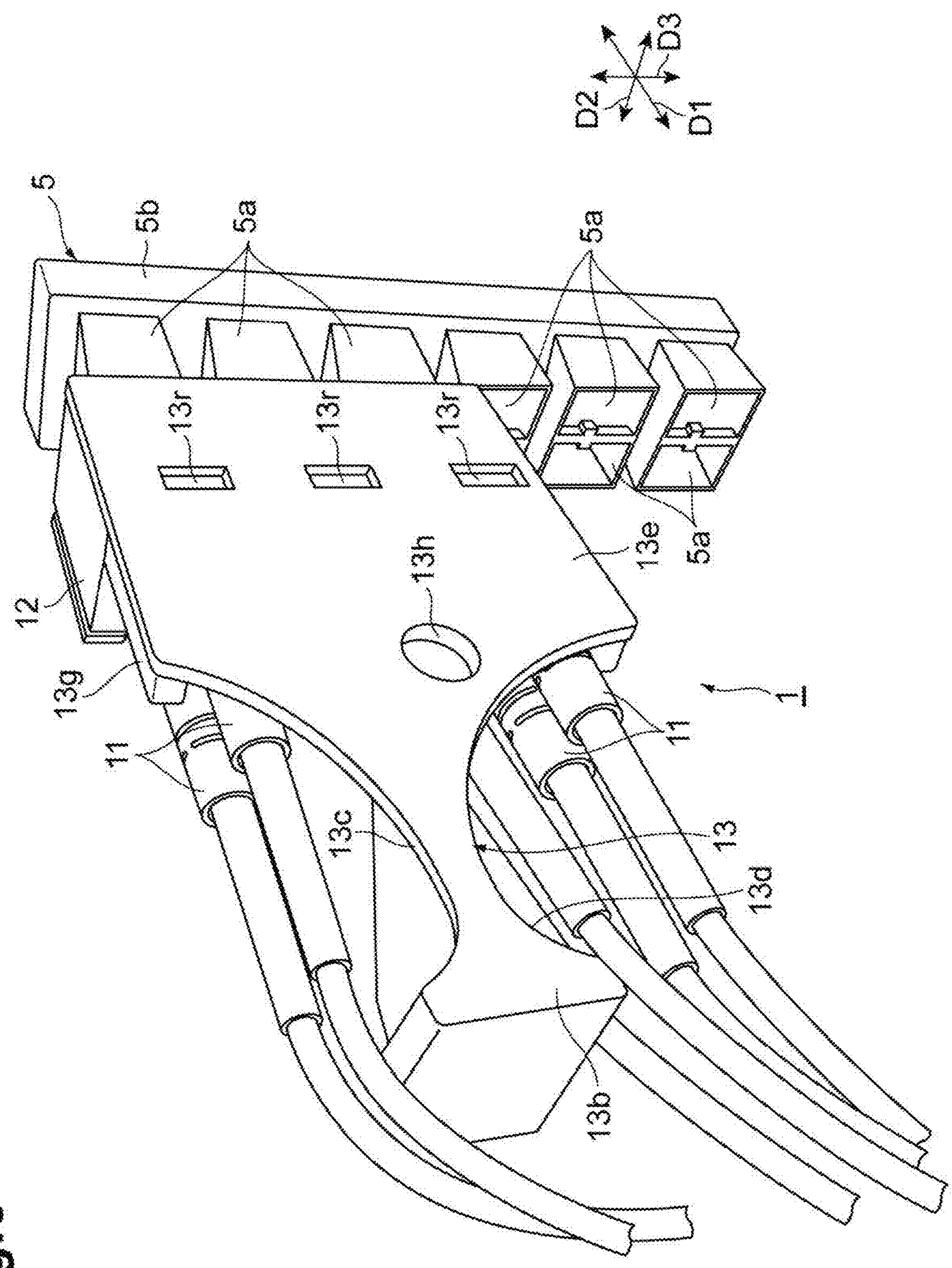
FIG. 3 is a perspective view illustrating the optical connector of FIG. 2.

FIG. 1 is a perspective view illustrating adapters 3 where an optical connector according to an exemplary embodiment is inserted into and extracted from. FIG. 2 illustrates a cap 5 according to an exemplary embodiment and is a side view in which two optical connectors 1 are arranged vertically. FIG. 3 is a perspective view of the optical connector 1. As an example, the optical connector 1 is an optical connector for inspection included in an inspection apparatus that inspects optical communication between a plurality of data centers. A rack of the data center is provided with an optical wiring rack with a plurality of optical fibers fused. The optical wiring rack includes a panel 2 and a plurality of adapters 3 held by the panel 2. For example, a plurality of holes is formed in the panel 2, and each adapter 3 is held in a state in which the adapter 3 is inserted into each of the plurality of holes. For example, the optical connector 1 is connected to the plurality of adapters 3, thereby inspecting the optical communication.

In recent years, as the amount of data communication has increased, a multi-core structure of the above-mentioned optical wiring rack has been performed, and the number of adapters 3 has also been increasing. For example, the number of adapters 3 installed in one panel 2 is 288. 48 adapters 3 are arranged along a first direction D2 intersecting a connection direction D1 in which the optical connector 1 is connected, and six adapters 3 are arranged along a second direction D3 intersecting both the connection direction D1 and the first direction D2. Since the optical connector 1 is the optical connector which is collectively inserted into and extracted from the plurality of adapters 3 arranged along the first direction D2 and the second direction D3, it is possible to shorten the time required for insertion and extraction even when the number of adapters 3 is large.

The optical connector 1 includes six (2×3) optical connector plugs 11 connected to each adapter 3, holders 12 for holding the plurality of optical connector plugs 11, and a handle 13 for holding a plurality of holders 12. For example, in the optical connector 1, two optical connector plugs 11 arranged in the first direction D2 and three optical connector plugs 11 arranged in the second direction D3 are held, such that a total of six (2×3) optical connector plugs 11 are held.

The optical connector plug 11, the holder 12, and the handle 13 are made of, for example, a resin material. The optical connector 1 is connected to the adapter 3 along the connection direction D1. The connection direction D1 is, for example, a direction in which the optical connector plug 11 protrudes from the holder 12, the first direction D2 is a direction perpendicular to the connection direction D1, and the second direction D3 is a direction perpendicular to both the connection direction D1 and the first direction D2.

In the optical connector 1 according to the present exemplary embodiment, two optical connector plugs 11 are disposed along the first direction D2, and three optical connector plugs 11 are disposed along the second direction D3. However, it is possible to appropriately change the number of the optical connector plugs 11 disposed along the first direction D2 and the number of the optical connector plugs 11 disposed along the second direction D3.

The optical connector plug 11 is an LC connector. The optical connector 1 is connected to a plurality of adapters 3 by each optical connector plug 11 being engaged with each adapter 3. The optical connector plug 11 includes a ferrule 11*a* for holding the optical fiber, a front housing 11*b* for housing the ferrule 11*a*, a latch 11*c* for engaging the optical connector plug 11 with the adapter 3, and a boot 11*g* extending from the front housing 11*b* to the opposite side of the adapter 3. An optical cable C with the optical fiber extends from the boot 11*g* to the opposite side of the adapter 3. In the following description, a description is sometimes made by assuming that a direction (an adapter 3 side) of the connection direction D1 in which the adapter 3 is installed with respect to the optical connector plug 11 is referred to as a forward direction and an opposite direction (an opposite side of the adapter 3) thereof is referred to as a backward direction.

The holder 12 collectively holds the plurality of optical connector plugs 11 arranged in the first direction D2. Each optical connector plug 11 is slidable by a predetermined amount in the connection direction D1 with respect to the holder 12, for example. A plurality of holders 12 are arranged along the second direction D3, and each holder 12 is fixed to the handle 13. The optical connector 1 includes, for example, three holders 12, and each holder 12 holds two optical connector plugs 11 arranged in the first direction D2.

The handle 13 is, for example, a plate shape extending in the connection direction D1 and the second direction D3. The handle 13 has an inner side surface 13*a* for holding each holder 12 and an outer side surface 13*e* facing the opposite side of the holder 12. The handle 13 has a grip portion 13*b* extending in the opposite side of the adapter 3. The grip portion 13*b* extends rearward from a rectangular portion located on the front side of the handle 13. The grip portion 13*b* has a narrow width portion 13*c* having a width decreasing in a rearward direction and a wide width portion 13*d* having a width increasing in the rearward direction from a rear end of the narrow width portion 13*c*. For example, in the handle 13, a width of the grip portion 13*b* (a rib 13*h* to be described later) in the first direction D2 is widened in the rearward direction, and as a result, the grip portion 13*b* has a shape that is easy to grip. The configuration of the handle 13 will be described in detail later.

The cap 5 according to the present exemplary embodiment seals the optical connector plug 11 which is not connected to the adapter 3. The cap 5 is provided to protect the optical connector plugs 11. The cap 5 has a plurality of engaging portions 5*a* to which each optical connector plugs 11 is engaged, and a base portion 5*b* located on the opposite side of the optical connector plugs 11 of the plurality of engaging portions 5*a*. Each engaging portion 5*a* has the same engaging structure as the adapter 3, for example. Therefore, it is possible to engage the optical connector plugs 11 with the engaging portions 5*a* in the same manner as when the optical connector plugs 11 are engaged with the adapters 3.

The base portion 5*b* has, for example, a shape of a rectangular plate, and the plurality of engaging portions 5*a* protrude from the base portion 5*b*. The cap 5 has two engaging portions 5*a* arranged in a width direction of the base portion 5*b*, and six engaging portions 5*a* arranged in the length direction of the base portion 5*b*. Therefore, twelve optical connector plugs 11 of the two optical connectors 1 are engaged with the cap 5. That is, the two handles 13, the six holders 12, and the twelve optical connector plugs 11 can be engaged with the cap 5.

Figure 4:
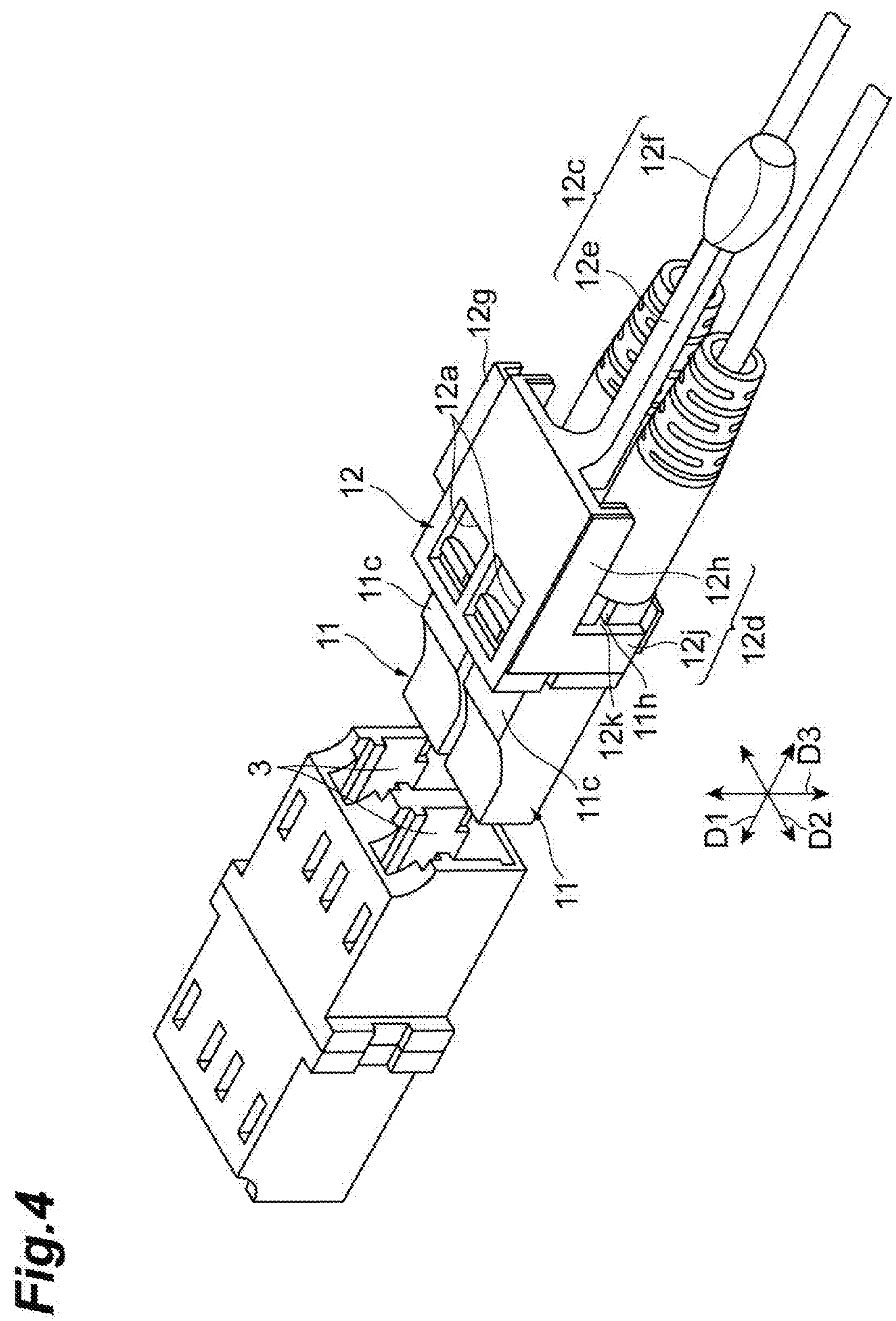
FIG. 4 is a perspective view illustrating an optical connector plug, a holder, and an adapter of the optical connector of FIG. 2.
Figure 5:
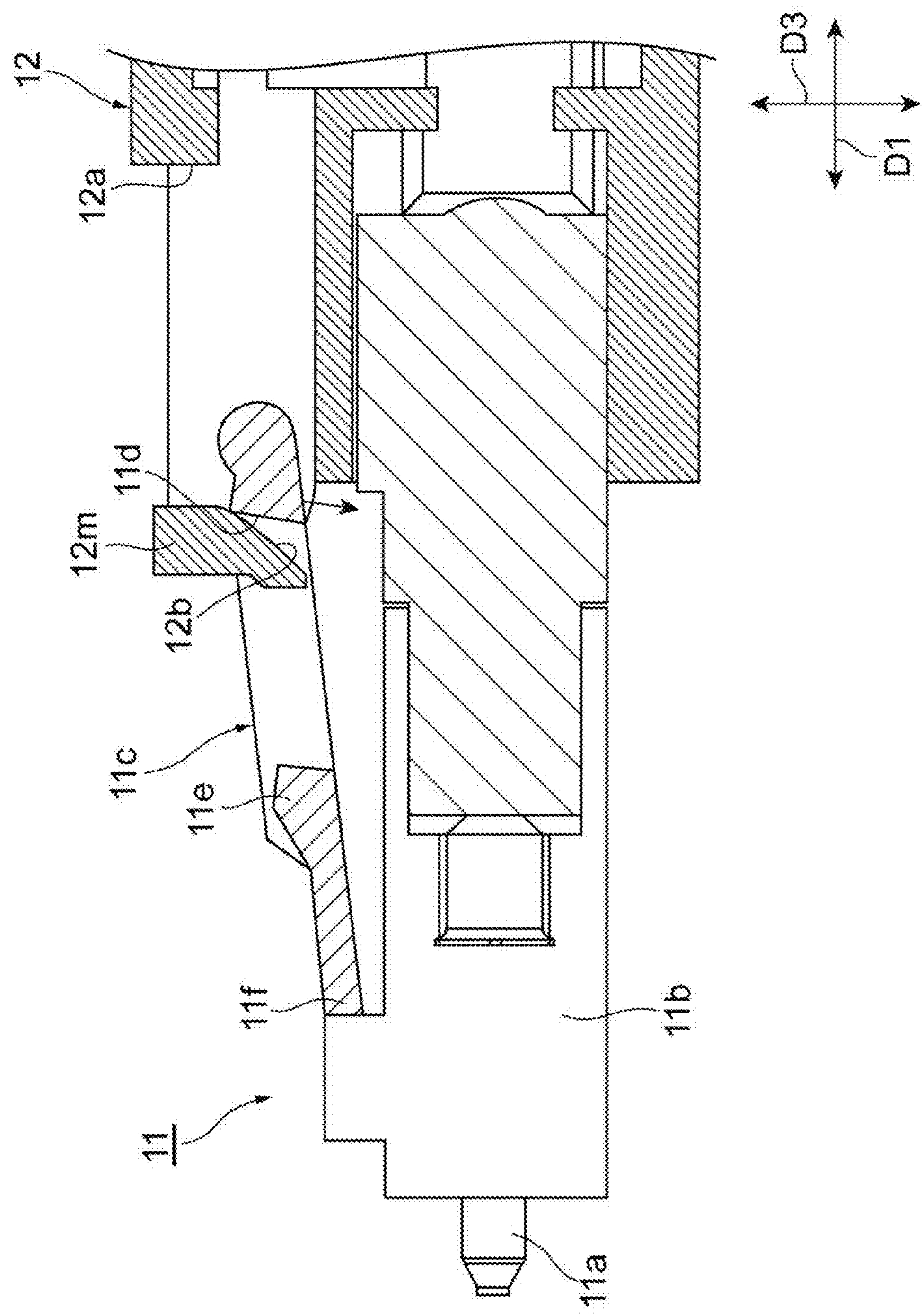
FIG. 5 is a cross-sectional view illustrating the optical connector plug and the holder of FIG. 4.

FIG. 4 is a perspective view illustrating a plurality of optical connector plugs 11 and adapters 3 held by the holder 12. FIG. 5 is an enlarged cross-sectional view of the optical connector plug 11 and the holder 12. As illustrated in FIGS. 4 and 5, the latch 11*c* of the optical connector plug 11 is formed in a plate shape that extends obliquely upward along the connection direction D1. The latch 11*c* includes an abutting portion 11*d* abutting on the holder 12, an engaging portion 11*e* engaged with the adapter 3, and a fixing portion 11*f* fixed to the front housing 11*b*. The holder 12 has an opening 12*a* through which the abutting portion 11*d* is exposed, and the opening 12*a* is formed in one side (upper side) of the holder 12 in the second direction D3.

The abutting portion 11*d*, the engaging portion 11*e*, and the fixing portion 11*f* are arranged side by side in this order from the rear side to the front side. The holder 12 is provided with a so-called push-pull mechanism, and it is possible to disengage the optical connector plug 11 from the adapter 3 by extracting the holder 12 in the connection direction D1. A material of the holder 12 is, for example, polycarbonate (PC), but it is possible to appropriately change the material of the holder 12.

Hereinafter, the push-pull mechanism of the holder 12 will be described. The abutting portion 11*d* and the engaging portion 11*e* in the latch 11*c* of the optical connector plug 11 are movable in the second direction D3 by bending in the second direction D3 starting from the fixing portion 11*f*. An inclined surface 12*b* on which the abutting portion 11*d* abuts is formed on a wall portion 12*m* located on the front side of the opening 12*a* of the holder 12. The inclined surface 12*b* is inclined forward, for example, in a downward direction.

When the holder 12 slides rearward along with the extraction of the holder 12, the abutting portion 11*d* is pushed down by the inclined surface 12*b*. As a result, the holder 12 is pulled and the inclined surface 12*b* of the holder 12 pushes down the entire latch 11*c* to disengage the engaging portion 11*e* and the adapter 3. In addition, it is possible to extract the optical connector plug 11 from the adapter 3 by pulling out the holder 12.

The holder 12 includes a main body portion 12*d* having the opening 12*a* as described above and provided to face the optical connector plug 11, and a grip portion 12*c* extending from the main body portion 12*d* to the opposite side (rear side) of the adapter 3. The main body portion 12*d* includes an opposing portion 12*h* opposing the boot 11*g* of the optical connector plug 11, and a pair of sandwiching portions 12*j* that sandwich the two optical connector plugs 11 from the first direction D2.

A protrusion 12*k* protruding inward from the sandwiching portion 12*j* is provided on an inner side of the pair of sandwiching portions 12*j*, and a slide groove 11*h* extending in the connection direction D1 is provided in the front housing 11*b* of the optical connector plug 11. The protrusion 12*k* slides in the connection direction D1 in the slide groove 11*h* by a predetermined amount so that the optical connector plug 11 slides in the connection direction D1 by a predetermined amount with respect to the holder 12.

The grip portion 12*c* is a portion gripped by a finger or the like when the holder 12 is pulled, and it is possible to easily pull the holder 12 by providing the grip portion 12*c* so as to be extended rearward. The grip portion 12*c* has a rod-shaped portion 12*e* extending rearward from the main body portion 12*d*, and an enlarged diameter portion 12*f* having a diameter expanded in a rear end of the rod-shaped portion 12*e*, and has a shape that is easily picked up by the enlarged diameter portion 12*f* with a finger. On one side of the main body portion 12*d* in the first direction D2, a protruding portion 12*g* fitted to the handle 13 is provided.

Figure 6:
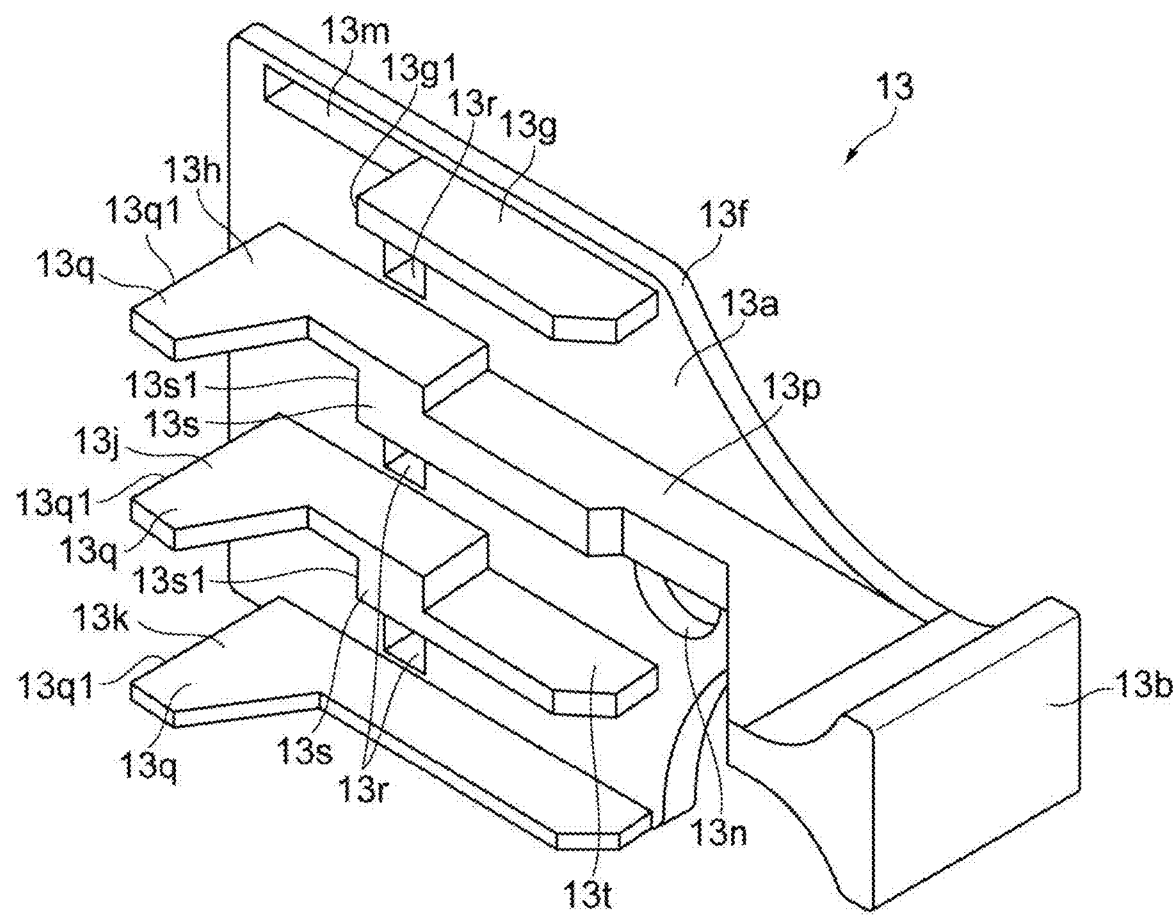
FIG. 6 is a perspective view illustrating a handle of the optical connector of FIG. 2.
Figure 6:
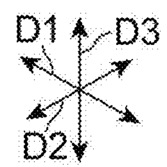
Figure 7:
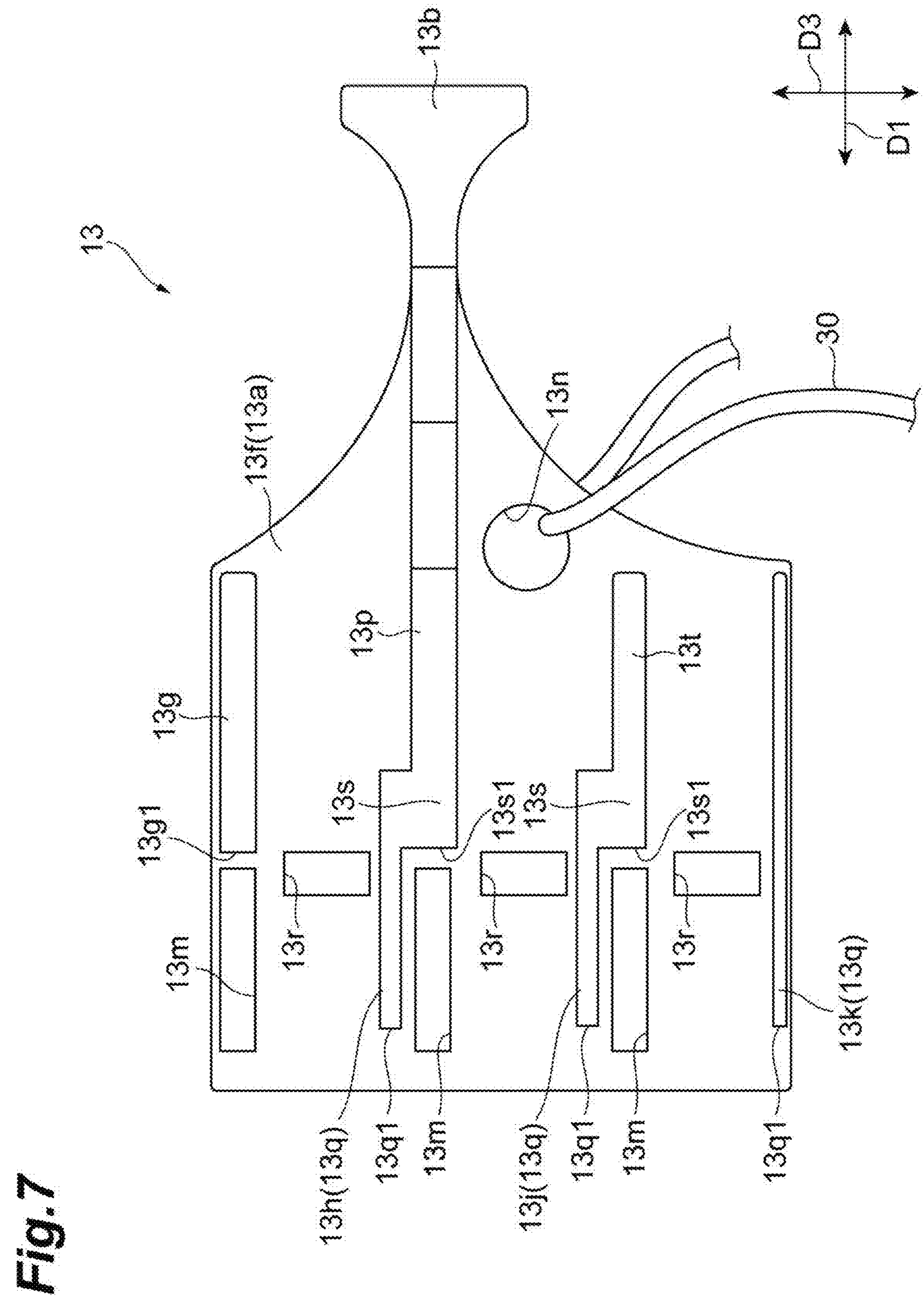
FIG. 7 is a side view illustrating the handle of FIG. 6.

Next, the handle 13 holding the plurality of holders 12 will be described in detail with reference to FIGS. 6 and 7. A material of the handle 13 is, for example, nylon, but it is possible to appropriately change the material of the handle 13. As described above, the handle 13 has the wall portion 13*f* of the plate shape having the inner side surface 13*a* and the outer side surface 13*e*, and the plurality of ribs 13*g*, 13*h*, 13*j*, and 13*k* protruding from the inner side surface 13*a*. For example, the wall portion 13*f* has a flat plate shape and does not have a portion protruding from the outer side surface 13*e* (see FIG. 3). Thereby, even though a large number of optical connectors 1 are connected to the plurality of adapters 3, it is possible for the handle 13 to be prevented from being disturbed.

In the wall portion 13*f*, a hole portion 13*m* into which the holder 12 is fitted, a hole portion 13*r* into which a detaching jig 20 to be described later is fitted, and a through hole 13*n* through which a cord 30 passes to be tied are formed. In FIG. 6, the illustration of the cord 30 is omitted. The cord 30 is provided to connect the handle 13 to the cap 5. One end of the cord 30 is tied to the through hole 13*n* and the other end of the cord 30 is tied to a through hole 5*c* (see FIG. 2) located at the end portion of the cap 5 in the length direction, so that the handle 13 and the cap 5 are connected to each other.

The rib 13*g*, the rib 13*h*, the rib 13*j*, and the rib 13*k* are arranged along the second direction D3. The rib 13*g*, the rib 13*h*, the rib 13*j*, and the rib 13*k* are arranged in this order from one side (upper side) to the other side (lower side) in the second direction D3. The boot 11*g* of the optical connector plug 11 passes between the rib 13*g* and the rib 13*h*, between the rib 13*h* and the rib 13*j*, and between the rib 13*j* and the rib 13*k*.

The rib 13*g* is provided on one side (upper side) of the handle 13 in the second direction D3 and on the rear side of the hole portion 13*m*. The rib 13*g* protrudes from the inner side surface 13*a* in the first direction D2, and the surface of the rib 13*g* on the side of the hole portion 13*m* is a contact surface 13*g*1 contacting the holder 12. The rib 13*h* protrudes from the inner side surface 13*a* in the first direction D2 between a pair of hole portions 13*m* arranged in the second direction D3. The rib 13*h* includes a protruding portion 13*q* located on the front side and protruding in the first direction D2, a stepped portion 13*s* protruding downward on the rear side of the hole portion 13*m*, and an extending portion 13*p* extending from the stepped portion 13*s* to the grip portion 13*b*. A front surface of the protruding portion 13*q* and a front surface of the stepped portion 13*s* are contact surfaces 13*q*1 and 13*s*1 that are in contact with the holder 12, respectively.

The through hole 13*n* described above is formed between the rib 13*h* and the rib 13*j*. The rib 13*j* has the protruding portion 13*q*, the stepped portion 13*s*, and an extending portion 13*t* extending rearward from the stepped portion 13*s*. The extending portion 13*t* extends from the stepped portion 13*s* of the rib 13*j* to the vicinity of a lower side of the through hole 13*n*. Like the rib 13*h*, the rib 13*j* has contact surfaces 13*q*1 and 13*s*1 on the front surface of the protruding portion 13*q* and the front surface of the stepped portion 13*s*, respectively. The rib 13*k* extends in the connection direction D1 on the other side (lower side) of the handle 13 in the second direction D3. The rib 13*k* is formed in a flat plate shape and has a protruding portion 13*q*. Like the ribs 13*h* and 13*j*, the rib 13*k* has a contact surface 13*q*1 on the front surface of the protruding portion 13*q*.

Figure 8:
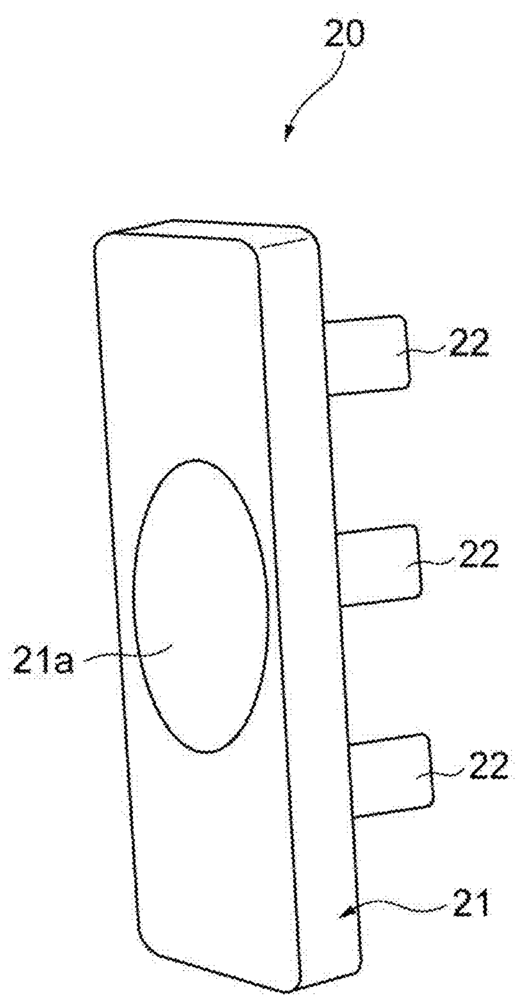
FIG. 8 is a perspective view illustrating a detaching jig for detaching the handle from the optical connector of FIG. 2.

The handle 13 holds the holder 12 by fitting the protruding portion 12*g* of the holder 12 into the hole portion 13*m*. As illustrated in FIG. 8, the detaching jig 20 according to the present exemplary embodiment is a detaching jig for detaching the handle 13 from the holder 12. The detaching jig 20 includes a main body portion 21 of a flat plate shape and a plurality of protruding portions 22 extending in an out-of-plane direction of the main body portion 21 from the main body portion 21. A depression 21*a* is provided on a surface of the main body portion 21 opposite to the protruding portion 22. It is possible to easily push the detaching jig 20 into the handle 13 by the depression 21*a*. The depression 21*a* is, for example, hemispherically recessed.

As illustrated in FIGS. 3 and 8, each of the plurality of protruding portions 22 is fitted into the hole portion 13*r* of the handle 13, and as a result, the detaching jig 20 is engaged with the handle 13. The handle 13 is detached from the holder 12 by the detaching jig 20 in a state in which each optical connector plug 11 is sealed by the cap 5. Specifically, it is possible to detach the handle 13 from the plurality of holders 12 by fitting the protruding portion 22 of the detaching jig 20 into each hole portion 13*r* formed in the outer side surface 13*e* of the handle 13 and pulling the grip portion 13*b* in the opposite side (the first direction D2) of the holder 12 with each hole portion 13*r* and the protruding portion 22 as a pivot.

Next, a method for inserting and extracting the optical connector 1 into and from the adapter 3 will be described. Hereinafter, a procedure for inserting the optical connector 1 illustrated in FIGS. 2 and 3 into the plurality of adapters 3 illustrated in FIG. 1 and connecting the optical connector 1 to the plurality of adapters 3 will be described. In an initial state, each optical connector plug 11 of the optical connector 1 is engaged with the cap 5, and each optical connector plug 11 is sealed by the cap 5.

The grip portion 13*b* of the handle 13 of the optical connector 1 in the initial state is gripped and the handle 13 is pulled to the opposite side of the cap 5. When the handle 13 is pulled, the latch 11*c* of the optical connector plug 11 is pushed down by the push-pull mechanism of the holder 12, and the latch 11*c* of each optical connector plug 11 is disengaged with each engaging portion 5*a* of the cap 5. Each optical connector plug 11 is detached from the cap 5 through the disengagement of each latch 11*c* with respect to each engaging portion 5*a*.

Thereafter, the grip portion 13*b* of the handle 13 is gripped and the six optical connector plugs 11 held by the three holders 12 held by the handle 13 are inserted into the adapters 3 in the connection direction D1. When the optical connector plug 11 is inserted in the connection direction D1, an inner wall of the adapter 3 pushes down the engaging portion 11*e* of the latch 11*c* and the engaging portion 11*e* rides over the inner wall of the adapter 3 to engage with the adapter 3. Therefore, the latch 11*c* is engaged with the adapter 3, and each optical connector plug 11 is connected to each adapter 3. Through the above operations, the insertion of the optical connector 1 into the adapter 3 is completed.

When the optical connector 1 is extracted from the adapter 3, the grip portion 13*b* of the handle 13 of the optical connector 1 is gripped and the handle 13 is pulled to the opposite side of the adapter 3. When the handle 13 is pulled to the opposite side of the adapter 3, the latch 11*c* of each optical connector plug 11 is pushed down by the push-pull mechanism of the holder 12, and the latch 11*c* is disengaged with each adapter 3. As described above, it is possible to easily extract the optical connector 1 from the adapter 3 by disengaging the latch 11*c* of each optical connector plug 11 and extracting the grip portion 13*b*.

Next, effects obtained from the optical connector 1, the detaching jig 20, and the cap 5 according to the present exemplary embodiment will be described in detail. The optical connector 1 includes the plurality of optical connector plugs 11 which are collectively connected to the plurality of adapters 3 along the connection direction D1, and the plurality of optical connector plugs 11 are arranged along the first direction D2 and are arranged along the second direction D3. The optical connector 1 has the plurality of holders 12 arranged along the second direction D3, and the plurality of optical connector plugs 11 arranged in the first direction D2 are gathered and held by each holder 12. In addition, in the optical connector 1, the plurality of holders 12 arranged in the second direction D3 are gathered and held by the handle 13.

Therefore, the plurality of optical connector plugs 11 are gathered and held in the first direction D2 by the holders 12 and are gathered and held in the second direction D3 by the handle 13. Therefore, when the plurality of optical connector plugs 11 are pushed into the adapters 3 in the connection direction D1 and inserted into the adapters 3, it is possible to suppress an escape of the pushing force in the first direction D2 and the second direction D3 intersecting the connection direction D1. Therefore, since the pushing force can be more reliably transmitted in the connection direction D1, the pushing force of the optical connector 1 can be reduced. As a result, the plurality of optical connector plugs 11 can be collectively and smoothly inserted and the plurality of optical connector plugs 11 can be sufficiently inserted.

The handle 13 has a wall portion 13*f* facing the first direction D2 of the holder 12. Therefore, even though a force is applied to the holder 12 in the first direction D2 at the time of inserting the plurality of optical connector plugs 11, rattling of the holder 12 can be suppressed by a contact of the holder 12 with the wall portion 13*f*. Therefore, by suppressing the rattling of the holder 12 holding the plurality of optical connector plugs 11, the insertion of the plurality of optical connector plugs 11 can be more smoothly performed.

The handle 13 may have a wall portion facing the second direction D3 of the holder 12. In this case, even though a force is applied to the holder 12 in the second direction D3 at the time of inserting the plurality of optical connector plugs 11, rattling of the holder 12 can be suppressed by a contact of the holder 12 with the wall portion. Therefore, as described above, the insertion of the plurality of optical connector plugs 11 can be more smoothly performed.

The handle 13 has ribs 13*g*, 13*h*, 13*j*, and 13*k* that are in contact with the holder 12 from the opposite side of the adapter 3. Therefore, even though the holder 12 tries to dislocate to the opposite sides of the adapters 3 when pushing the plurality of optical connector plugs 11 into the adapters 3, the dislocation of the holder 12 can be suppressed by a contact of the ribs 13*g*, 13*h*, 13*j*, and 13*k* with the holder 12. The ribs 13*g*, 13*h*, 13*j*, and 13*k* may not be in constant contact with the holder 12, or may be in contact with the holder 12 only when the holder 12 is dislocated rearward.

As described above, since the dislocation of the holder 12 at the time of inserting the plurality of optical connector plugs 11 can be suppressed by the ribs 13*g*, 13*h*, 13*j*, and 13*k* which are in contact with the holder 12, the insertion of the plurality of optical connector plugs 11 held by the holder 12 into the adapters 3 can be more smoothly and sufficiently performed. Since each optical connector plug 11 is inserted into the adapter 3 in a state in which it is sandwiched between the holder 12 and the ribs 13*h*, 13*j*, and 13*k*, the insertion of each optical connector plug 11 into each adapter 3 can be stably performed.

The optical connector plug 11 has a latch 11*c* engaging the adapter 3, and the holder 12 pushes down the latch 11*c* of the optical connector plug 11 when pulled to the opposite side of the adapter 3 to release the engagement between the optical connector plug 11 and the adapter 3. That is, the holder 12 includes a push-pull mechanism that pushes down the latch 11*c* of the optical connector plug 11 when pulled to the opposite side of the adapter 3 to release the engagement of the latch 11*c*. Therefore, by pulling the holder 12 to the opposite side of the adapter 3, the engagement between the optical connector plug 11 and the adapter 3 can be easily released. Therefore, the extraction of the optical connector 1 from the adapter 3 can be easily performed.

The detaching jig 20 according to the present exemplary embodiment is a jig used in the optical connector 1, and detaches the handle 13 from the plurality of holders 12 in a state in which it is engaged with the handle 13. Since the handle 13 can be detached from the plurality of holders 12 by the detaching jig 20, the plurality of optical connector plugs 11 (for example, the optical connector plugs 11 illustrated in FIG. 4) arranged in the first direction D2 can be separated from the plurality of optical connector plugs 11 arranged in both the first direction D2 and the second direction D3. Therefore, the plurality of separated optical connector plugs 11 arranged in the first direction D2 can be inserted into a desired adapter 3.

That is, by detaching the handle 13 from the holder 12, the insertion and extraction of the plurality of optical connector plugs 11 into and from the adapters 3 can be performed in the state in which the optical connector plugs 11 are held only by the holder 12, as illustrated in FIG. 4. In the present exemplary embodiment, since the handle 13 is detachable with respect to the holder 12, the six optical connector plugs 11 held by the holder 12 and the handle 13 can be inserted into and extracted from the adapters 3, and the two optical connector plugs 11 held by the holder 12 can be inserted into and extracted from the adapters 3.

As described above, the optical connector plugs 11 can be held by the holder 12 and the handle 13 when gathering and holding a large number of optical connector plugs 11 (six in the present exemplary embodiment), and the optical connector plugs 11 can be held only by the holder 12 when a small number (two in the present exemplary embodiment) of the optical connector plugs 11 are to be individually inserted into the adapters 3.

Therefore, a large number of optical connector plugs 11 can be collectively inserted into and extracted from the adapters 3 while a small number of optical connector plugs 11 can be individually inserted into and extracted from the adapters 3. The insertion of the optical connector plugs 11 into other adapters having a different pitch in the first direction D2 or a different pitch in the second direction D3 can be flexibly performed by individually inserting and extracting a small number of optical connector plugs 11.

The cap 5 according to the present exemplary embodiment is a cap used in the optical connector 1, and is engaged with the plurality of optical connector plugs 11 to seal the plurality of optical connector plugs 11. By the cap 5, the plurality of optical connector plugs 11 detached from the adapter 3 can be reliably sealed and the plurality of optical connector plugs 11 can be protected.

The handle 13 is detached from the holder 12 by the detaching jig 20 in a state in which each optical connector plug 11 is sealed by the cap 5. Therefore, since the optical connector plugs 11 are not exposed when the handle 13 is detached, the optical connector plugs 11 can be protected from contamination or the like.

The optical connector 1 holds the six optical connector plugs 11 connected to each adapter 3. As described above, since the optical connector 1 holds the six optical connector plugs 11, the six optical connector plugs 11 can be efficiently and collectively inserted into and extracted from the adapter 3. However, if the number of optical connector plugs held by the optical connector is too large, it is likely that an end surface of any of the plurality of optical connector plugs becomes dirty, and it is assumed that it takes time to clean the end surface. On the other hand, if the number of optical connector plugs 11 held by the optical connector 1 is six as in the present exemplary embodiment, the collective insertion and extraction can be efficiently performed and the cleaning management of the end surface of the optical connector plug 11 can be easily performed.

Hereinabove, although the exemplary embodiments of the optical connector, the detaching jig, and the cap according to the present disclosure have been described, the present invention is not limited to the above-described exemplary embodiments, and various modifications can be made. For example, the shape, size, material, number, and arrangement of parts of the optical connector, the detaching jig, and the cap can be appropriately changed.

For example, in the exemplary embodiment described above, the holder 12 having the grip portion 12*c* and the handle 13 having the ribs 13*g*, 13*h*, 13*j*, and 13*k* have been described, but the shape, size, material, number, and arrangement of the holder and handle can be appropriately changed. For example, the holder may be a holder with no grip portion, or the handle may be a handle with 1 to 3 ribs or 5 or more ribs. In addition, the shape of the rib can be appropriately changed, and the rib can also be omitted.

In the exemplary embodiment described above, although the optical connector 1 holding 6 (2×3) optical connector plugs 11 has been described, the number of optical connector plugs held by the optical connector can be appropriately changed. For example, the optical connector may be an optical connector used in a panel 2 in which six adapters 3 are arranged along the second direction D3 and having the six optical connector plugs arranged along the second direction D3 and a total of 12×N (N is a natural number) optical connector plugs.

In the exemplary embodiment described above, the optical connector 1, which is an optical connector for inspection included in the inspection apparatus for inspecting optical communication between a plurality of data centers, has been described. However, the optical connector according to the present invention may be an optical connector used for purposes other than the inspection. In addition, the optical connector according to the present invention is not limited to the panel 2 and the adapter 3, but can be applied to various panels and adapters.

What is claimed is:

1. An optical connector including a plurality of optical connector plugs collectively connected to each of a plurality of adapters arranged along a first direction and a second direction intersecting the first direction, along a connection direction intersecting both the first direction and the second direction, the optical connector comprising:

a plurality of holders configured to be arranged along the second direction while holding the plurality of optical connector plugs arranged in the first direction, wherein each holder of the plurality of holders is configured to hold at least two optical connector plugs of the plurality of optical connector plugs;

a handle configured to hold one side of the plurality of holders arranged in the second direction; and a detaching jig, separate and distinct from the handle, configured to detach, from the handle, at least two holders of the plurality of holders held by the handle.

2. The optical connector according to claim 1, wherein the handle has a wall portion facing at least one of the first direction side and the second direction side of the holder.

3. The optical connector according to claim 1, wherein the handle has ribs configured to be in contact with the holder from an opposite side of the adapter.

4. The optical connector according to claim 1, wherein the optical connector plug has a latch engaging the adapter, and the holder pushes down the latch when pulled to the opposite side of the adapter to release the engagement between the optical connector plug and the adapter.

5. The optical connector according to claim 1, wherein the detaching jig detaches the handle from the plurality of holders in a state in which the detaching jig is engaged with the handle.

6. A cap used in the optical connector according to claim 1, wherein the cap is engaged with the plurality of optical connector plugs to seal the plurality of optical connector plugs.

7. The optical connector according to claim 1, wherein a width of a grip portion of the handle in the first direction widens in a rearward direction.

8. The optical connector according to claim 1, wherein the handle includes a plurality of hole portions, each hole portion for detaching a respective holder of the plurality of holders from the handle.

9. The optical connector according to claim 1, wherein each holder of the plurality of holders includes a protruding portion protruding from one side of the holder, wherein the handle includes a plurality of hole portions, and wherein each hole portion configured to receive a respective protruding portion of a holder of the plurality of holders.

10. An optical connector including a plurality of optical connector plugs collectively connected to each of a plurality of adapters arranged along a first direction and a second direction intersecting the first direction, along a connection direction intersecting both the first direction and the second direction, the optical connector comprising:

a plurality of holders configured to be arranged along the second direction while holding the plurality of optical connector plugs arranged in the first direction, wherein each holder of the plurality of holders is configured to hold at least two optical connector plugs of the plurality of optical connector plugs; and a handle configured to hold one side of the plurality of holders arranged in the second direction.

11. The optical connector according to claim 10, wherein the handle has a wall portion facing at least one of the first direction side and the second direction side of the holder.

12. The optical connector according to claim 10, wherein the handle has ribs configured to be in contact with the holder from an opposite side of the adapter.

13. The optical connector according to claim 10, wherein the optical connector plug has a latch engaging the adapter, and the holder pushes down the latch when pulled to the opposite side of the adapter to release the engagement between the optical connector plug and the adapter.

14. The optical connector according to claim 10, further comprising:

a detaching jig, separate and distinct from the handle, configured to detach, from the handle, at least two holders of the plurality of holders held by the handle, wherein the detaching jig detaches the handle from the plurality of holders in a state in which the detaching jig is engaged with the handle.

15. A cap used in the optical connector according to claim 10, wherein the cap is engaged with the plurality of optical connector plugs to seal the plurality of optical connector plugs.

16. The optical connector according to claim 10, wherein a width of a grip portion of the handle in the first direction widens in a rearward direction.

17. The optical connector according to claim 10, wherein the handle includes a plurality of hole portions, each hole portion for detaching a respective holder of the plurality of holders from the handle.

18. The optical connector according to claim 10, wherein each holder of the plurality of holders includes a protruding portion protruding from one side of the holder, wherein the handle includes a plurality of hole portions, and wherein each hole portion configured to receive a respective protruding portion of a holder of the plurality of holders.

* * * * *